US011787270B2

(12) United States Patent
Lee

(10) Patent No.: US 11,787,270 B2
(45) Date of Patent: Oct. 17, 2023

(54) SLIDING DOOR DEVICE FOR VEHICLE

(71) Applicants: Hyundai Motor Company, Seoul (KR); Kia Corporation, Seoul (KR)

(72) Inventor: Jaeseung Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/885,256

(22) Filed: Aug. 10, 2022

(65) Prior Publication Data
US 2023/0148422 A1 May 11, 2023

(30) Foreign Application Priority Data

Nov. 10, 2021 (KR) .................. 10-2021-0154239

(51) Int. Cl.
*B60J 5/06* (2006.01)
(52) U.S. Cl.
CPC ........................ *B60J 5/06* (2013.01)
(58) Field of Classification Search
CPC .. B60J 5/06; B60J 5/047; E05D 15/30; E05D 15/101; E05D 2015/1026
USPC .......................................................... 296/155
See application file for complete search history.

(56) References Cited

U.S. PATENT DOCUMENTS

| | | | | |
|---|---|---|---|---|
| 9,587,724 B2* | 3/2017 | Choi | ...................... | E05D 15/58 |
| 9,777,811 B2* | 10/2017 | Choi | ..................... | E05D 15/101 |
| 11,384,580 B2* | 7/2022 | Yun | ............................ | B60J 5/06 |
| 11,505,045 B2* | 11/2022 | Yun | ........................ | E05D 15/101 |
| 11,555,343 B2* | 1/2023 | Yun | ............................ | B60J 5/047 |
| 2021/0079703 A1* | 3/2021 | Yun | ........................ | E05D 15/30 |
| 2022/0412142 A1* | 12/2022 | Lee | ......................... | E05D 15/58 |
| 2023/0173897 A1* | 6/2023 | Lee | ............................. | B60J 5/06 |
| | | | | 296/146.1 |
| 2023/0182550 A1* | 6/2023 | Lee | ..................... | E05D 15/1081 |
| | | | | 296/155 |
| 2023/0184015 A1* | 6/2023 | Lee | ....................... | E05F 15/646 |
| | | | | 296/155 |
| 2023/0202272 A1* | 6/2023 | Lee | ............................ | B60J 5/06 |
| | | | | 49/70 |
| 2023/0202273 A1* | 6/2023 | Lee | ............................ | B60J 5/06 |
| | | | | 296/146.1 |

FOREIGN PATENT DOCUMENTS

KR        92-0008085 B1     9/1992

* cited by examiner

*Primary Examiner* — Jason S Morrow
(74) *Attorney, Agent, or Firm* — MORGAN, LEWIS & BOCKIUS LLP

(57) ABSTRACT

A sliding door device for a vehicle includes a door configured to open or close a door opening portion formed in a vehicle body; a door arm including a first end portion rotatably connected to an end portion of the door, and a second end portion configured to be movable along a side sill of the vehicle body; a lower slider coupled to the second end portion of the door arm and configured to be rectilinearly movable along the side sill of the vehicle body; a lower arm plate connecting the second end portion of the door arm and the lower slider and configured to perform a cycloidal rotation and a rectilinear movement when the lower slider moves along the side sill; and a first rail providing a route through which the lower arm plate performs the cycloidal rotation and the rectilinear movement when the lower slider moves along the side sill.

12 Claims, 14 Drawing Sheets

SLIDING DOOR DEVICE FOR VEHICLE

CROSS-REFERENCE TO RELATED APPLICATION

The present application claims priority to Korean Patent Application No. 10-2021-0154239 filed on Nov. 10, 2021, the entire contents of which is incorporated herein for all purposes by this reference.

BACKGROUND OF THE INVENTION

Field of the Present Disclosure

The present disclosure relates to a sliding door device for a vehicle, and more particularly, to a sliding door device for a vehicle, which is configured to open or close a door opening portion of a vehicle body while sliding forward or rearward in a longitudinal direction of a vehicle.

Description of Related Art

In general, a vehicle has an occupant compartment having a predetermined size in which a driver or an accompanied occupant may be seated, and occupant compartment opening/closing doors are provided on a vehicle body to open or close the occupant compartment.

In the case of a passenger vehicle, the occupant compartment opening/closing doors include a front door provided at a front side in a longitudinal direction of the vehicle and a rear door provided at a rear side in the longitudinal direction of the vehicle. The front door and the rear door are typically provided on the vehicle body to be rotatable by hinges.

Meanwhile, in the case of a van in which many persons may be accommodated, the occupant compartment opening/closing doors slide forward and rearward in the longitudinal direction of the vehicle to open or close the occupant compartment.

In the case of the slide type occupant compartment opening/closing door for a van, the occupant compartment opening/closing door is configured to move rearward in the longitudinal direction of the vehicle to open the occupant compartment, and move forward in the longitudinal direction of the vehicle to close the occupant compartment. Therefore, the slide type occupant compartment opening/closing door has an advantage in that a space required to open or close the door is smaller in the slide type occupant compartment opening/closing door than in the hinged occupant compartment opening/closing door applied to the passenger vehicle and a door opening formed in the vehicle body may be completely opened even though the space required to open or close the door is small.

However, in the case of the slide type occupant compartment opening/closing door generally, a space in which a door arm penetrates into a side sill portion of the vehicle at a time of opening or closing the door is excessively large because of a fixed sliding door arm structure. For the present reason, there is a problem in that a height of a floor of the vehicle needs to be increased to ensure the space.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present disclosure are directed to providing a sliding door device for a vehicle, which adopts a sliding door structure using a cycloidal curvilinear motion, solving a problem in which a space in which a door arm is provided to penetrate into a side sill portion of a vehicle is excessively large.

Various aspects of the present disclosure are directed to providing a sliding door device for a vehicle, the sliding door device including: a door configured to open or close a door opening portion formed in a vehicle body; a door arm including a first end portion rotatably connected to an end portion of the door, and a second end portion configured to be movable along a side sill of the vehicle body; a lower slider coupled to the second end portion of the door arm and configured to be rectilinearly movable along the side sill of the vehicle body; a lower arm plate connecting the second end portion of the door arm and the lower slider and configured to perform a cycloidal rotation and a rectilinear movement when the lower slider moves along the side sill; and a first rail providing a route through which the lower arm plate performs the cycloidal rotation and the rectilinear movement when the lower slider moves along the side sill.

A plurality of first rollers may protrude from the lower arm plate and be spaced from one another at predetermined intervals, and the first rollers may be inserted into the first rail and move.

The first rollers may include two rollers having a first height and two rollers having a second height, the four rollers may be alternately provided, the second height may be smaller than the first height, the first rail may be provided in plural, and the plurality of first rails may have depths respectively corresponding to the heights of the four rollers.

A first end portion of the first rail may have a curved path so that the first roller inserted into the first rail performs a cycloidal rotation, and a portion of the first rail, which is directed toward a rear side of the vehicle from the first end portion of the first rail, may have a straight path in an extension direction of the side sill.

The lower arm plate may perform the cycloidal rotation along the first rail before the door arm is provided in a direction perpendicular to the door at a time of opening or closing the door, and the lower arm plate may perform the rectilinear movement along the first rail after the door arm is provided in the direction perpendicular to the door.

The second end portion of the door arm, the lower slider, and the lower arm plate may be connected by an arm pin in a direction perpendicular to the vehicle body, and the door arm and the lower arm plate may be configured to rotate about the arm pin.

The second end portion of the door arm may have two layers provided in a vertical direction, and the lower slider may be coupled between the two layers of The second end portion of the door arm by the arm pin.

The lower arm plate may be rotatably coupled to an upper surface of the door arm by the arm pin.

The first end portion of the door arm may be hingedly and rotatably connected to the door by a door pin.

A second protrusion member may protrude from an upper surface of the door arm between the first end portion and the second end portion of the door arm, a second rail may be formed on the side sill and provide a route through which the door arm turns toward the outside of the vehicle body, and the second protrusion member may move along the second rail.

According to the exemplary embodiment of the present disclosure, the sliding door structure of the vehicle using the cycloidal curvilinear motion may be adopted so that the penetration of the door arm into the vehicle body may be eliminated, implementing a flat structure of the vehicle body and reducing a height (step height) of the vehicle body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
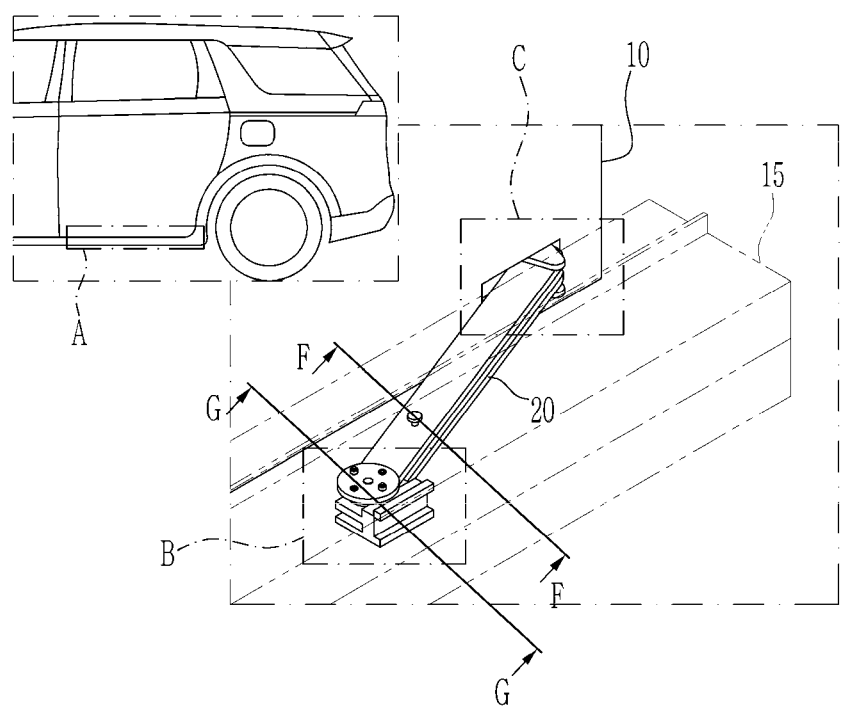
FIG. 1 is a view schematically illustrating a sliding door device for a vehicle according to various exemplary embodiments of the present disclosure.

It may be understood that the appended drawings are not necessarily to scale, presenting a somewhat simplified representation of various features illustrative of the basic principles of the invention. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the invention(s) will be described in conjunction with exemplary embodiments of the present disclosure, it will be understood that the present description is not intended to limit the invention(s) to those exemplary embodiments of the present disclosure. On the other hand, the invention(s) is/are intended to cover not only the exemplary embodiments of the present disclosure, but also various alternatives, modifications, equivalents and other embodiments, which may be included within the spirit and scope of the invention as defined by the appended claims.

Hereinafter, embodiments of the present disclosure will be described in detail with reference to the accompanying drawings so that those with ordinary skill in the art to which an exemplary embodiment of the present disclosure pertains may easily carry out the embodiments. The present disclosure may be implemented in various different ways and is not limited to the exemplary embodiments described herein.

Furthermore, the constituent elements having the same configurations in the several embodiments will be assigned with the same reference numerals and described only in the representative embodiment, and only the constituent elements, which are different from the constituent elements according to the representative embodiment, will be described in other exemplary embodiments of the present disclosure.

It is noted that the drawings are schematic and are not illustrated based on actual scales. Relative dimensions and proportions of parts illustrated in the drawings are exaggerated or reduced in size for clarity and convenience in the drawings, and any dimension is just illustrative but not restrictive. The same reference numerals designate the same structures, elements or components illustrated in two or more drawings to exhibit similar characteristics. When one component is described as being positioned "above" or "on" another component, one component can be positioned "directly on" another component, and one component can also be positioned on another component with other components interposed therebetween.

The exemplary embodiment of the present disclosure specifically illustrates an example of the present disclosure. As a result, various modifications of the drawings are expected. Therefore, the exemplary embodiments are not limited to specific forms in regions illustrated in the drawings, and for example, include modifications of forms by the manufacture thereof.

Hereinafter, a structure of a sliding door device for a vehicle according to various exemplary embodiments of the present disclosure will be described with reference to the accompanying drawings.

Figure 2:
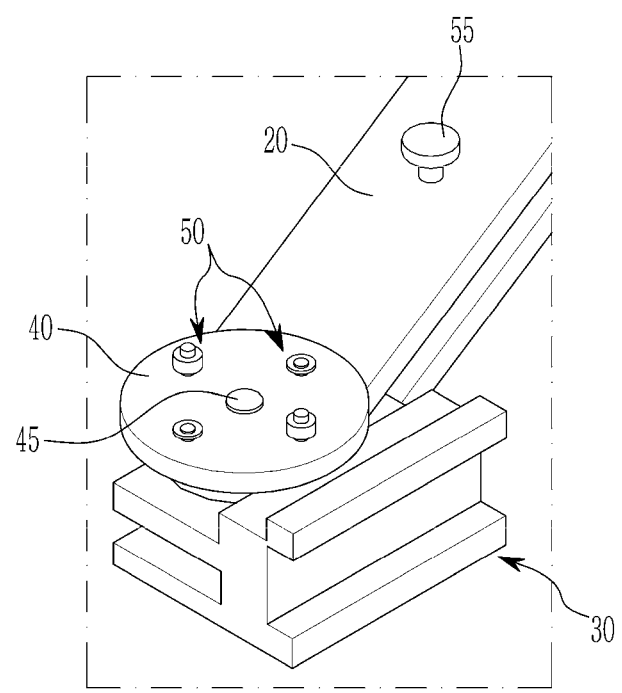
FIG. 2 is an enlarged view of part 'B' in FIG. 1.
Figure 3:
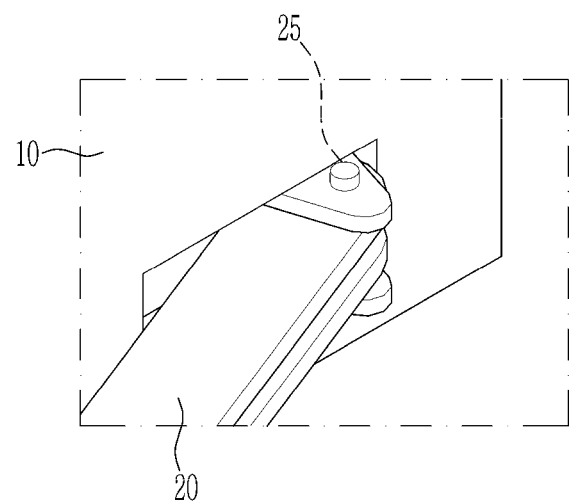
FIG. 3 is an enlarged view of part 'C' in FIG. 1.

FIG. 1 is a view schematically illustrating the sliding door device for a vehicle according to the exemplary embodiment of the present disclosure, FIG. 2 is an enlarged view of part 'B' in FIG. 1, and FIG. 3 is an enlarged view of part 'C' in FIG. 1.

Referring to FIG. 1, the sliding door device for a vehicle according to the exemplary embodiment of the present disclosure may be applied to a lower side, i.e., part 'A' of a rear door 10 provided at a rear side based on a longitudinal direction of the vehicle. The sliding door device may be applied to a structure in which the rear door 10 is opened or closed while moving toward the inside or outside of the vehicle and sliding forward or rearward in the longitudinal direction of the vehicle.

The sliding door device for a vehicle according to the exemplary embodiment of the present disclosure includes the rear door 10, a door arm 20, a lower slider 30, a lower arm plate 40, and a first rail 60.

The rear door 10 opens or closes a door opening portion formed in a vehicle body of the vehicle. The door arm 20 is connected to the rear door 10 and the vehicle body. One end portion of the door arm 20 may be rotatably connected to one side of the rear door 10, and the other end portion of the door arm 20 may be rotatably and rectilinearly movably connected to a side sill 15 of the vehicle body. The side sill 15 may be provided at a lateral lower side of the vehicle body and provided in the longitudinal direction of the vehicle body. A side rail may be provided on the side sill 15 and provide a route through which the other end portion of the door arm 20 may move.

The lower slider 30 is coupled to the other end portion of the door arm 20, and the lower slider 30 may rectilinearly move along the side rail provided in a longitudinal direction of the side sill 15.

Furthermore, the lower arm plate 40 is coupled to the other end portion of the door arm 20 and connects the other end portion of the door arm 20 and the lower slider 30. The lower arm plate 40 may perform a cycloidal rotation and a rectilinear movement when the lower slider 30 moves along the side rail provided on the side sill 15.

The first rail 60 is provided on the side sill 15 and provided separately from the side rail. The first rail 60 may provide a route along which the lower arm plate 40 performs the cycloidal rotation and the rectilinear movement when the lower slider 30 moves along the side rail.

As illustrated in FIG. 2, the plurality of first protrusion members 50 may protrude on the lower arm plate 40 and be spaced from one another at predetermined intervals in a circumferential direction of the lower arm plate 40. The first protrusion members 50 may be inserted into the first rail 60 provided on the side sill 15 and move. The other end portion of the door arm 20, the lower slider 30, and the lower arm plate 40 may be coupled in a vertical direction of the vehicle body by an arm pin 45. The door arm 20 and the lower arm plate 40 may rotate about the arm pin 45 relative to the lower slider 30.

Meanwhile, as illustrated in FIG. 3, one end portion of the door arm 20 may be hingely and rotatably connected to the rear door 10 by a door pin 25. The door pin 25 may vertically penetrate one end portion of the door arm 20 through a protruding portion formed on the rear door 10 and connect the door arm 20 to the rear door 10.

Figure 4:
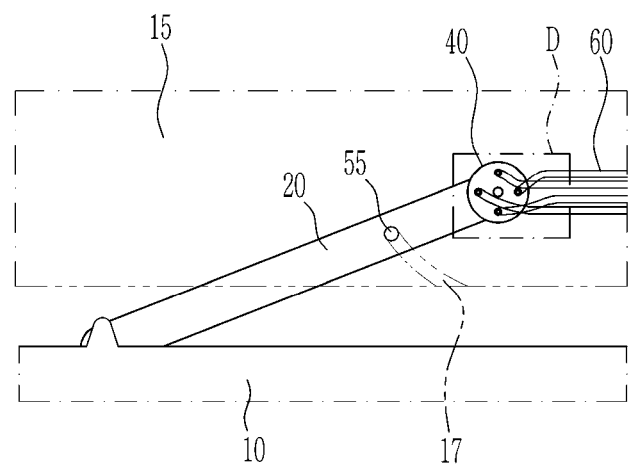
FIG. 4 is a view exemplarily illustrating a state before a door arm is provided in a direction perpendicular to a door of the sliding door device for a vehicle according to the exemplary embodiment of the present disclosure at the time of opening or closing the door when viewed from above.
Figure 5:
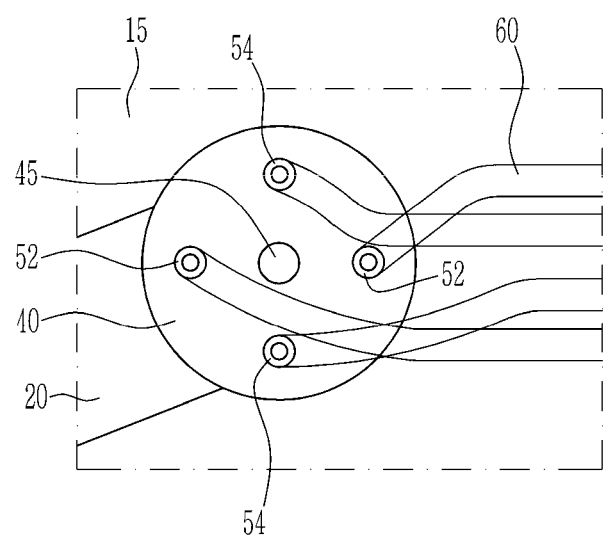
FIG. 5 is an enlarged view of part 'D' in FIG. 4.

FIG. 4 is a view exemplarily illustrating a state before a door arm is provided in a direction perpendicular to the door of the sliding door device for a vehicle according to the exemplary embodiment of the present disclosure at the time of opening or closing the door when viewed from above, and FIG. 5 is an enlarged view of part 'D' in FIG. 4.

Referring to FIG. 4 and FIG. 5, a second protrusion member 55 protrudes from an upper surface of the door arm 20 between one end portion and the other end portion of the door arm 20. A second rail 17 is formed on the side sill 15 and provided at a position corresponding to the second protrusion member 55. The second rail 17 may have a curved shape, and the second protrusion member 55 including a roller thereon may be inserted into the second rail 17. When the door arm 20 moves along the second rail 17, the door arm 20 may turn toward the outside of the vehicle body.

Furthermore, first rails 60 may be provided on the side sill 15 at the side adjacent to one end portion of the door arm 20, and the first protrusion members 50 provided on the upper surface of the lower arm plate 40 may be inserted into the first rails 60. The first rails 60 may provide a movement route for the lower arm plate 40, the lower slider 30, and the door arm 20. One end portion of each of the first rails 60 has a curved path so that the lower arm plate 40 may perform the cycloidal rotation as the first protrusion members 50 inserted into the first rails 60 move. A portion of each of the first rails 60, which is directed toward the rear side of the vehicle from one end portion of each of the first rails 60, has a straight path in an extension direction of the side sill 15 so that the lower arm plate 40 may rectilinearly move.

The first protrusion members 50 may include two rollers 52 having a first height and two rollers 54 having a second height, and the rollers 52 and 54 may protrude from the lower arm plate 40 and alternately provided in the circumferential direction of the lower arm plate 40. In the instant case, the second height may be smaller than the first height. Four first rails 60 may be formed to respectively correspond to the heights of the four first rollers 50.

As illustrated in FIG. 4 and FIG. 5, at the initial time of opening the rear door 10 of the vehicle, i.e., before the door arm 20 is provided in the direction perpendicular to the rear door 10, the first protrusion members 50 are inserted into curved portions of the first rails 60, and the first protrusion members 50 move along the curved portions of the first rails 60 so that the lower arm plate 40 performs the cycloidal rotation. Furthermore, as the lower arm plate 40 rotates, the door arm 20 gradually turns at an angle approximately perpendicular to the rear door 10.

Figure 6:
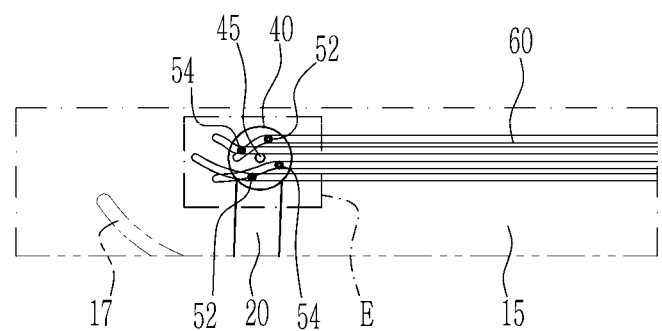
FIG. 6 is a view exemplarily illustrating a state after the door arm is provided in the direction perpendicular to the door of the sliding door device for a vehicle according to the exemplary embodiment of the present disclosure at the time of opening or closing the door when viewed from above.
Figure 7:
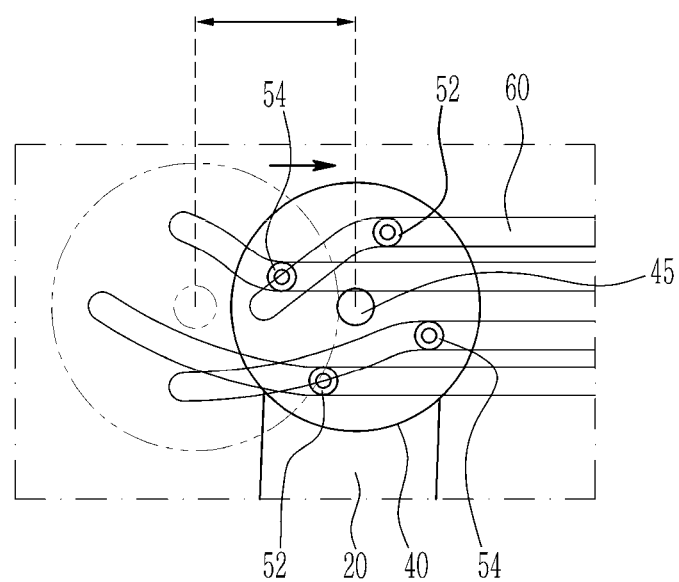
FIG. 7 is an enlarged view of part 'E' in FIG. 6.

FIG. 6 is a view exemplarily illustrating a state after the door arm is provided in the direction perpendicular to the door of the sliding door device for a vehicle according to the exemplary embodiment of the present disclosure at the time of opening or closing the door when viewed from above, and FIG. 7 is an enlarged view of part 'E' in FIG. 6.

As illustrated in FIG. 6 and FIG. 7, when the lower arm plate 40 completes the cycloidal rotation as the first protrusion members 50 pass through the curved portions of the first rail 60, the first protrusion members 50 are inserted into the straight portions of the first rail 60, and the door arm 20 is provided in the direction perpendicular to the rear door 10. Thereafter, in the state in which the first protrusion members 50 are inserted into the straight portions of the first rails 60, the door arm 20, the lower arm plate 40, and the rear door 10 move straight toward the rear side of the vehicle in the extension direction of the side sill 15 so that the rear door 10 is opened.

Figure 8:
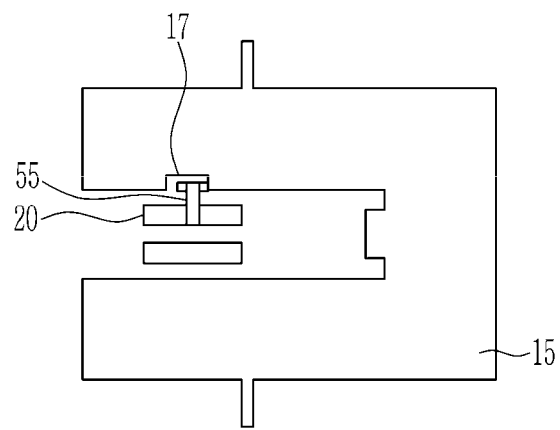
FIG. 8 is a view taken along line 'F-F' in FIG. 1.
Figure 9:
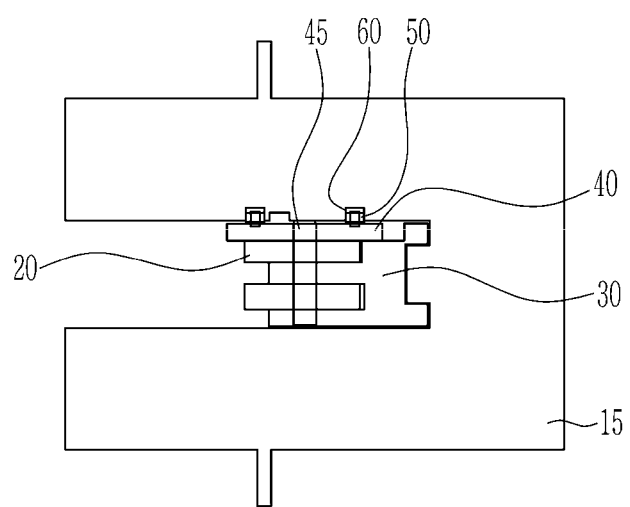
FIG. 9 is a view taken along line 'G-G' in FIG. 1.

FIG. 8 is a view taken along line 'F-F' in FIG. 1, and FIG. 9 is a view taken along line 'G-G' in FIG. 1.

Referring to FIG. 8, the second protrusion member 55 protruding from the upper surface of the door arm 20 between one end portion and the other end portion of the door arm 20 is inserted into the second rail 17 formed on the internal upper surface of the side sill 15 so that the door arm 20 may turn as the second protrusion member 55 moves along the second rail 17.

Referring to FIG. 9, the plurality of first protrusion members 50 protruding from the lower arm plate 40 is inserted into the first rails 60 formed on the internal upper surface of the side sill 15, and the first protrusion members 50 move along the first rails 60 so that the other end portion of the door arm 20 and the lower arm plate 40 may perform the cycloidal rotation and the rectilinear movement. The first rail 60 may be provided in plural, and the plurality of first rails 60 may have depths corresponding to the heights of the plurality of first protrusion members 50 having the different heights.

Figure 10A:
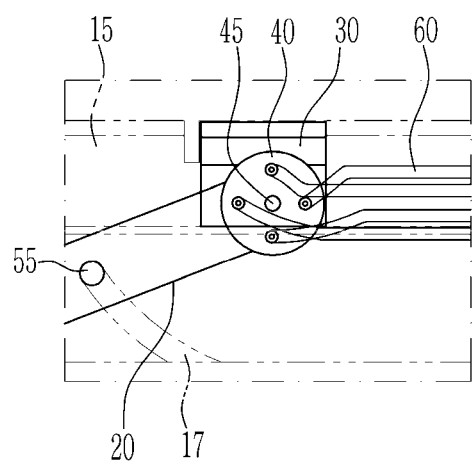
FIG. 10A, FIG. 10B and FIG. 10C are views exemplarily illustrating an operational sequence of the sliding door device for a vehicle according to the exemplary embodiment of the present disclosure.
Figure 10B:
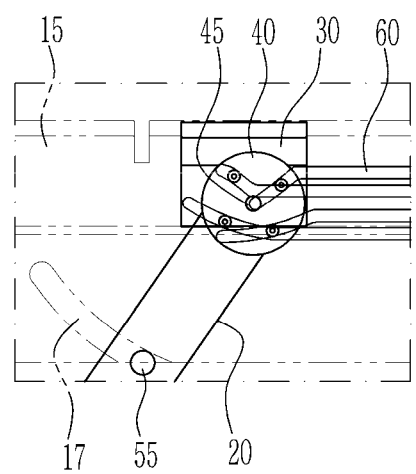
Figure 10C:
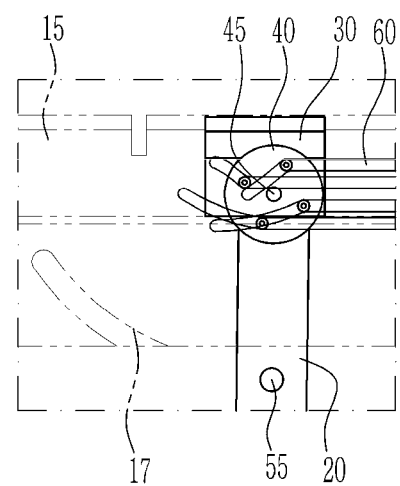

FIG. 10A, FIG. 10B and FIG. 10C are views exemplarily illustrating an operational sequence of the sliding door device for a vehicle according to the exemplary embodiment of the present disclosure.

Referring to FIG. 10A, at the initial time of opening the rear door 10 of the vehicle, the first protrusion members 50 are inserted into the curved portions of the first rails 60, the second protrusion member 55 is inserted into one end portion of the second rail 17, and the door arm 20 is provided at an oblique angle with respect to the rear door 10.

Thereafter, the lower arm plate 40 performs the cycloidal rotation as the first protrusion members 50 move along the curved portions of the first rails 60, and the door arm 20 turns as the second protrusion member 55 moves along the second rail 17 as shown in FIG. 10B.

Thereafter, the first protrusion members 50 move to the end points of the curved portions of the first rails 60, and the second protrusion member 55 moves along the second rail 17 to a point provided on the same line as the end points of the curved portions of the first rail 50 so that the door arm 20 is provided in the direction perpendicular to the rear door 10. Thereafter, the lower slider 30, the lower arm plate 40, and the door arm 20 rectilinearly move along the first rails 60 toward the rear side of the vehicle as shown in FIG. 10C.

Figure 11:
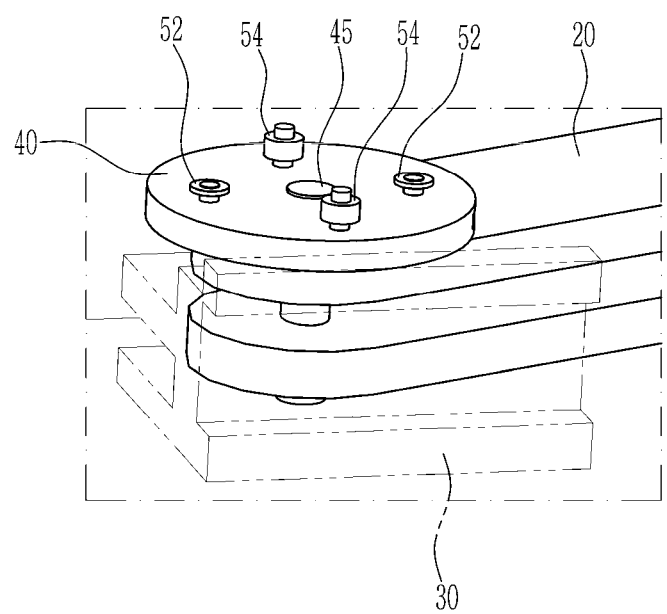
FIG. 11 is a view exemplarily illustrating a state in which the door arm, a lower slider, and a lower arm plate of the sliding door device for a vehicle according to the exemplary embodiment of the present disclosure are coupled.
Figure 12:
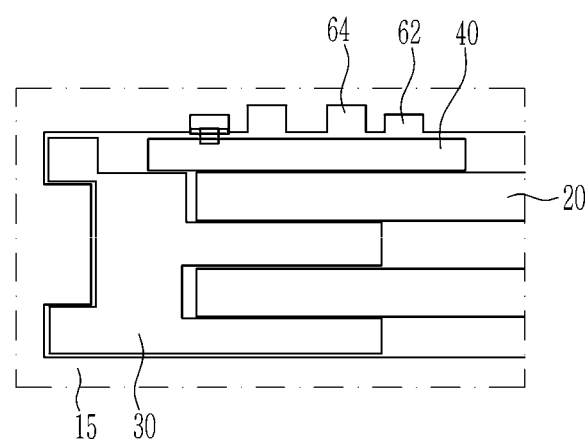
FIG. 12 is a view exemplarily illustrating first rails of the sliding door device for a vehicle according to the exemplary embodiment of the present disclosure.

FIG. 11 is a view exemplarily illustrating a state in which the door arm, the lower slider, and the lower arm plate of the sliding door device for a vehicle according to the exemplary embodiment of the present disclosure are coupled, and FIG. 12 is a view exemplarily illustrating the first rails of the sliding door device for a vehicle according to the exemplary embodiment of the present disclosure.

Referring to FIG. 11 and FIG. 12, the other end portion of the door arm 20 may have two layers provided in the vertical direction, and the lower slider 30 is coupled between the two layers of the other end portion of the door arm 20 by the arm pin 45. The other end portion of the door arm 20, the lower slider 30, and the lower arm plate 40 may be connected in the direction perpendicular to the vehicle body by the arm pin 45, and the door arm 20 and the lower arm plate 40 may rotate about the arm pin 45. A center portion of the lower arm plate 40 may be coupled to the upper surface of the door arm 20 and rotatable about the arm pin 45. The plurality of first protrusion members 50 having different heights may be provided on the upper surface of the lower arm plate 40, and the plurality of first rails 17 may be provided on the internal upper surface of the side sill 15 and have depths respectively corresponding to the heights of the first rollers 50.

As described above, the sliding door structure of the vehicle using the cycloidal curvilinear motion may be adopted so that the penetration of the door arm into the vehicle body may be eliminated, implementing a flat structure of the vehicle body and thus reducing a height (step height) of the vehicle body.

While the exemplary embodiments of the present disclosure have been described, the present disclosure is not limited to the embodiments. The present disclosure covers all modifications which may be easily made from the exemplary embodiments of the present disclosure by those skilled in the art and considered as being equivalent to the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the invention to the precise forms disclosed, and obviously many modifications and variations are possible in light of the above teachings. The exemplary embodiments were chosen and described to explain predetermined principles of the invention and their practical application, to enable others skilled in the art to make and utilize various exemplary embodiments of the present disclosure, as well as various alternatives and modifications thereof. It is intended that the scope of the invention be defined by the Claims appended hereto and their equivalents.

What is claimed is:

1. A sliding door apparatus for a vehicle, the sliding door apparatus comprising:
   a door configured to open or close a door opening portion formed in a vehicle body;
   a door arm including a first end portion rotatably connected to an end portion of the door, and a second end portion configured to be movable along a side sill of the vehicle body;
   a lower slider coupled to the second end portion of the door arm and configured to be rectilinearly movable along the side sill of the vehicle body;
   a lower arm plate connecting the second end portion of the door arm and the lower slider and configured to perform a cycloidal rotation and a rectilinear movement when the lower slider moves along the side sill; and
   a first rail providing a route through which the lower arm plate performs the cycloidal rotation and the rectilinear movement when the lower slider moves along the side sill.

2. The sliding door apparatus of claim 1,
   wherein a plurality of first protrusion members protrudes from the lower arm plate and is spaced from one another at predetermined intervals in a circumferential direction of the lower arm plate, and
   wherein each of the first protrusion members is inserted into a corresponding first rail and move along the corresponding first rail.

3. The sliding door apparatus of claim 2,
   wherein the first protrusion members include first and second protrusions having a first height and third and fourth protrusions having a second height, the first, third, second and fourth protrusions are provided in series, and the second height is smaller than the first height, and
   wherein the plurality of first rails has depths respectively corresponding to the first height of the first protrusion, the first height of the second protrusion, the second height of the third protrusions, and the second height of the fourth protrusion.

4. The sliding door apparatus of claim 2,
   wherein a first end portion of each first rail has a curved path so that each first protrusion member inserted into each first rail performs a cycloidal rotation, and
   wherein a portion of each first rail, which is directed toward a rear side of the vehicle from the first end portion of each first rail, has a straight path in an extension direction of the side sill.

5. The sliding door apparatus of claim 4, wherein the lower arm plate performs the cycloidal rotation along each first rail before the door arm is provided in a direction perpendicular to the door at a time of opening or closing the door, and the lower arm plate performs the rectilinear movement along each first rail after the door arm is provided in the direction perpendicular to the door.

6. The sliding door apparatus of claim 2, wherein a roller is rotatably mounted on each of the first protrusion members.

7. The sliding door apparatus of claim 1, wherein the second end portion of the door arm, the lower slider, and the lower arm plate are connected by an arm pin in a direction perpendicular to the vehicle body, and the door arm and the lower arm plate are configured to rotate about the arm pin.

8. The sliding door apparatus of claim 7, wherein the second end portion of the door arm has first and second layers provided in a perpendicular direction, and the lower slider is coupled between the first and second layers of the second end portion of the door arm by the arm pin.

9. The sliding door apparatus of claim 8, wherein the lower arm plate is rotatably coupled to an upper surface of the door arm by the arm pin.

10. The sliding door apparatus of claim 1, wherein the first end portion of the door arm is hingedly and rotatably connected to the door by a door pin.

11. The sliding door apparatus of claim 1,
wherein a second protrusion member protrudes from an upper surface of the door arm between the first end portion and the second end portion of the door arm,
wherein a second rail is formed on the side sill and provides a route through which the door arm turns toward the outside of the vehicle body, and
wherein the second protrusion member moves along the second rail.

12. The sliding door apparatus of claim 11, wherein a roller is rotatably mounted on the second protrusion member.

\* \* \* \* \*